June 24, 1952 W. KASTEN 2,601,616
FLUID FILTERING AND METERING UNIT
Filed June 17, 1950
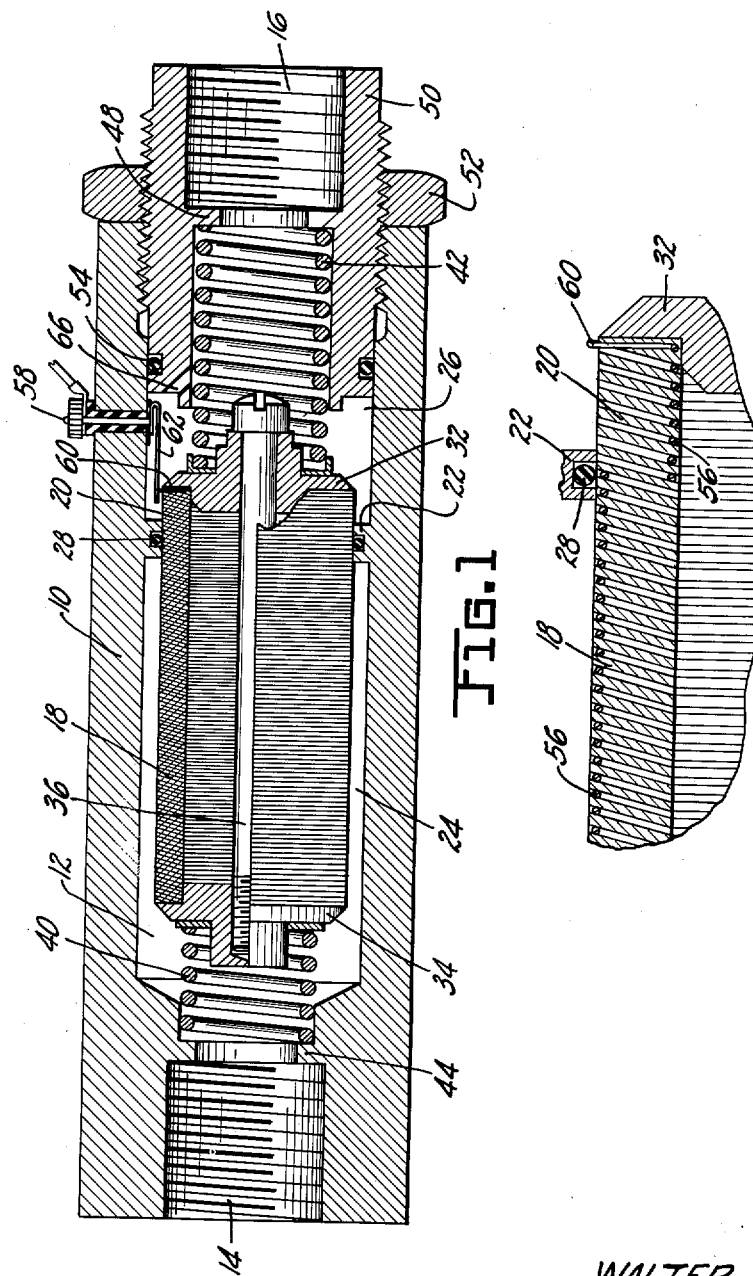
INVENTOR.
WALTER KASTEN
BY
M. A. Hobbs
ATTORNEY Patented June 24, 1952

2,601,616

UNITED STATES PATENT OFFICE 2,601,616

FLUID FILTERING AND METERING UNIT

Walter Kasten, Detroit, Mich., assignor to Bendix Aviation Corporation, South Bend, Ind., a corporation of Delaware Application June 17, 1950, Serial No. 168,784

13 Claims. (Cl. 219—39)

The present invention relates to a fluid flow control system, and particularly to a filtering and metering unit for fluid systems.

The invention pertains to a device similar to the one disclosed and claimed in my copending application Serial No. 793,303, filed December 22, 1947. The earlier device includes the combination of cylindrical filtering and metering elements arranged in axial alignment and consisting of a plurality of annular-shaped layers having radial pores therebetween forming passages for the fluid. The two elements are secured together by a stem or stud adapted to apply a predetermined end pressure on the elements to give them a desired flow capacity, and are so arranged that the fluid, in passing through the unit, first passes through the filter element, for example from outside into the hollow interior and then through the metering element from the hollow interior to the outside. The present invention is an improvement on the prior structure and has as one of its principal objects to provide a means for varying the flow capacity of the metering element in accordance with the differential in pressure across said element.

Another object of the invention is to provide a means for varying the flow capacity of the aforesaid metering element in accordance with variations in the viscosity and pressure of the fluid anterior to said element.

Another object of the invention is to provide a filtering and metering device of the aforesaid type having a means for raising the temperature of the fluid adjacent the element to prevent the formation of ice on the surface thereof.

Further objects and advantages of the invention will be apparent from the following description and accompanying drawing, wherein one specific embodiment thereof is shown:

In the drawing:

Figure 1 is a cross-sectional view of my filtering and metering units showing the several members thereof in their operative position; and Figure 2 is an enlarged partial cross-sectional view of a modified form of my filtering and metering elements.

Referring more specifically to the drawing, a housing 10 of the unit is shown as a cylindrical body adapted to be connected directly into a fluid line of a hydraulic system or the like and contains a longitudinal fluid passage 12 with a fluid inlet 14 and a fluid outlet 16, said inlet and outlet being provided with a screw threaded portion for connecting the unit into a fluid line. Integral filtering and metering elements 18 and 20, respectively, are disposed longitudinally in passage 12 and are supported laterally by an annular partition 22 which divides said passage into a filtering chamber 24 and a metering chamber 26, an O-ring seal 28 preferably being provided for sealing chamber 24 from chamber 26 on the outside of said elements.

The filtering element 18 and the metering element 20 are preferably of the same general construction and may consist of a plurality of washer-like layers, either as individual layers or as the convolutions of a helically wound unit, having radial pores between each layer to provide passages for the fluid being filtered and metered. The layers of the filtering and metering elements may be of a fibrous material held together by a discontinuous bond so distributed that radial pores are formed between the layers at frequent intervals. The discontinuity of the bond may be controlled by using a paper or fibrous material having a predetermined rugosity on both surfaces thereof so that the valleys of the rugosities forming the passages and the peaks thereof form the points of contact between the adjacent layers. The paper or fibrous material is preferably treated with a thermosetting resinous material such as phenolic formaldehyde condensation product. After the elements treated with this material have been formed, they are heated to a temperature and for a time sufficient to cause the resinous material to set, making the material forming the layers of the elements, but not the elements themselves, impervious to fluid, the pores between the layers remaining open after the treatment.

The ends of the elements are closed by plates 32 and 34 secured rigidly in place by a stud or shaft 36 extended through plate 32 and threadedly received in a recess of plate 34. The degree to which the stud is tightened determines the pore size between the layers of the elements, i. e. the greater the pressure applied by the stud on the elements, the tighter the layers are pressed together and thus the smaller the pores between the layers. Calibrated springs 40 and 42 are provided at each end of the assembled filtering and metering elements to permit the elements to move longitudinally under excess fluid pressure, spring 40 reacting between plate 34 and an annular shoulder 44 near the fluid inlet and spring 42 reacting between plate 32 and an annular shoulder 48 near the outlet. A fixed abutment may be used in place of spring 40. The outlet end of passage 12 is large enough to admit the elements into the passage. A removable sleeve 50 is inserted in the end of said passage after the elements are inserted in passage 12, and locked in place by a nut 52. A sealing ring 54 is preferably provided between said sleeve and the wall of said passage.

In order to prevent the formation of ice on the surface of the elements and to decrease the viscosity of the fluid when necessary, an electrical resistor wire 56 may be wound between the convolutions of the elements, the wire for the filtering element being adjacent the outside surface thereof and the wire for the metering element being adjacent the inside surface. This feature is covered by my copending applications Serial No. 33,628 filed June 17, 1948, and 83,442 filed March 25, 1949. In the embodiment shown, the wire is wound continuously in the element and connected at one end with a terminal 58 through pin 60, leaf spring 62, said pin and spring forming a sliding contact to permit the elements to slide longitudinally without breaking the circuit. The other end of the wire is grounded through plate 34 and spring 40 to the housing 10. The wire may be insulated, but if the fluid is a nonconductor, insulation is unnecessary.

In the operation of the device, fluid flows through inlet 14 into chamber 24, passes inwardly through filter element 18, outwardly through metering element 20, and flows from the device through outlet 16. Since the effective area of the filtering element is substantially larger than the effective area of the metering element, the principal drop in pressure in the unit occurs across the metering element. If the differential in pressure across the metering element should increase substantially above normal pressure, as by increased viscosity of the fluid or the accumulation of ice on the elements, the elements move longitudinally to the right, as shown in the drawing, opposed by spring 42, thereby increasing the effective area of the metering element 20, and maintaining a predetermined flow of fluid through the unit. The inner end of sleeve 50 functions as a stop for the elements and determines the maximum effective area of the metering unit. In the event the element seats against the inner end of the said sleeve, the fluid passes from chamber 26 to the outlet through a passage 66. After the adverse condition in the device has been removed or corrected, spring 42 returns the elements to their normal operative position.

Various modifications may be made in the construction of my filtering and metering device without departing from the scope of the invention. Further, the invention is not limited to any particular type of material for either the housing or filtering and metering elements or to any specific shape of the several members or elements of the device.

I claim:

1. A fluid filtering and flow restricting device comprising a fluid inlet chamber, a fluid outlet chamber, a partition between said chambers having an opening therethrough, a hollow member having perforated side walls and substantially closed ends extending through said opening, the portion of said member in the inlet chamber constituting a filter element, the portion in the outlet chamber constituting a metering element, and a spring in the outlet chamber urging said member toward the inlet chamber.

2. A fluid filtering and flow restricting device comprising a fluid inlet chamber, a fluid outlet chamber, a partition between said chambers, having an opening therethrough, a longitudinally movable hollow member having perforated side walls and closed ends extending through and filling said opening, the portion of said member in the inlet chamber constituting a filter element, the portion in the outlet chamber constituting a metering element, a spring in the inlet chamber urging said member toward the outlet chamber, and a spring in the outlet chamber urging said member toward the inlet chamber.

3. A filtering and metering device comprising a chamber having a fluid inlet adjacent one end and a fluid outlet adjacent the other end, a hollow cylindrical member in said chamber composed of a plurality of layers forming a porous wall, means closing the ends of said member, an annular partition around said member dividing the chamber into two compartments, an abutment at each end of said chamber, and a spring between each abutment and the adjacent end of said member.

4. A filtering and metering device comprising a chamber having a fluid inlet at one end and a fluid outlet at the other end, a hollow cylindrical member having a porous wall and substantially closed ends, an annular partition in said chamber around said member dividing the chamber into two compartments, an abutment on the downstream side of said member, and a spring between said abutment and the adjacent end of said member, whereby a substantially constant fluid flow is maintained irrespective of variations in the viscosity of the fluid.

5. A filtering and metering device comprising a cylindrical chamber having a fluid inlet at one end and a fluid outlet at the other end, a hollow cylindrical member in said chamber composed of a plurality of washer-like layers forming a porous wall, plates on the ends of said member, an annular partition in said chamber around said member dividing the chamber into two compartments, an abutment on the upstream side of said member to limit the movement of said member in that direction, an abutment on the downstream side of said member, and a spring between said last mentioned abutment and the adjacent end of said member, whereby a substantially constant fluid flow is maintained for any given inlet pressure irrespective of variations in the viscosity of the fluid.

6. A filtering and metering device comprising a chamber having a fluid inlet adjacent one end and a fluid outlet adjacent the other end, a hollow cylindrical member in said chamber composed of a plurality of layers forming a porous wall, plates on the ends of said member, an annular partition in said chamber around said member dividing the chamber into two compartments and said member into a filtering element and a metering element in upstream downstream relation, respectively, an abutment at each end of said chamber, and a spring between each abutment and the adjacent end plate of said member, whereby the flow capacity of the metering element varies with variation in the head across said member.

7. A fluid filtering and flow restricting device comprising a fluid inlet chamber, a fluid outlet chamber, a partition between said chambers having an opening therethrough, a longitudinally movable hollow member having side walls composed of helically wound strip material with radial pores therebetween and extending through said opening into each chamber, the portion extending into the inlet chamber constituting a filter element and the portion extending into the outlet chamber constituting a metering element, plates closing the ends of said member, a screw threaded member for variably applying end pressure to said member to vary the size of said pores, a spring in the inlet chamber urging said member toward the outlet chamber, and an abutment in said outlet chamber for said member.

8. A fluid filtering and flow restricting device comprising a fluid inlet chamber, a fluid outlet chamber, a partition between said chambers having a round opening therethrough, a hollow cylindrical member having side walls composed of helically wound strip material with radial pores therebetween and extending through said opening into each chamber, the portion extending into the inlet chamber constituting a filter element and the portion extending into the outlet chamber constituting a metering element, plates closing the ends of said member, a screw threaded member for variably applying end pressure to said member to vary the size of said pores, a spring in the inlet chamber urging said member toward the outlet chamber, and a spring in the outlet chamber urging said member toward the inlet chamber.

9. A fluid filtering and flow restricting device comprising a fluid inlet chamber, a fluid outlet chamber, a partition between said chambers having an opening therethrough, a longitudinally movable hollow member having porous side walls of helically wound strip material and extending through said opening into each chamber, means closing the ends of said member, the portion extending into the inlet chamber constituting a filter element and the portion extending into the outlet chamber constituting a flow restricting element, an electrical heating means adjacent the outside surface of said filter element, an electrical heating means adjacent the inside surface of said restricting element, a resilient means in the inlet chamber urging said member toward the outlet chamber, and an abutment for limiting the movement of said member by said resilient means.

10. A fluid filtering and flow restricting device comprising a fluid inlet chamber, a fluid outlet chamber, a partition between said chambers having a round opening therethrough, a hollow cylindrical member having side walls of helically wound strip material with radial pores therebetween and extending through said opening into each chamber, means closing the ends of said member, the portion extending into the inlet chamber constituting a filter element and the portion extending into the outlet chamber constituting a metering element, an electrical heating means embedded in the outside surface of said filter element, an electrical heating means embedded in the inside surface of said metering element a spring in the inlet chamber urging said member toward the outlet chamber, and a spring in the outlet chamber urging said member toward the inlet chamber.

11. A fluid filtering and flow restricting element comprising a hollow cylindrical member having closed ends and porous side walls composed of a plurality of layers, an electrical heating means adjacent the outside surface along one end of said member and an electrical heating means adjacent the inside surface along the other end.

12. A fluid filtering and flow restricting element comprising a hollow member having closed ends and porous side walls composed of helically wound strip material one end forming the filtering element and the other end forming the metering element an electrical heating means adjacent the outside surface of said filter element, and an electrical heating means adjacent the inside surface of said metering element.

13. Fluid filtering and metering elements comprising a hollow cylindrical member having porous side walls composed of helically wound strip material, plates closing each end of said member, the side walls adjacent one end forming the filtering element and the side walls adjacent the other end forming the metering element, and an electrical heating means embedded between the convolutions of the side walls adjacent the surface of inflowing fluid.

WALTER KASTEN.

REFERENCES CITED

The following references are of record in the file of this patent:

UNITED STATES PATENTS

| Number | Name | Date |
| --- | --- | --- |
| 1,224,117 | Nesmith | Apr. 24, 1917 |
| 2,421,704 | Kasten | June 3, 1947 |